Sept. 7, 1937.  J. F. TUCKER  2,092,563
SCREW MECHANISM
Original Filed Feb. 12, 1936
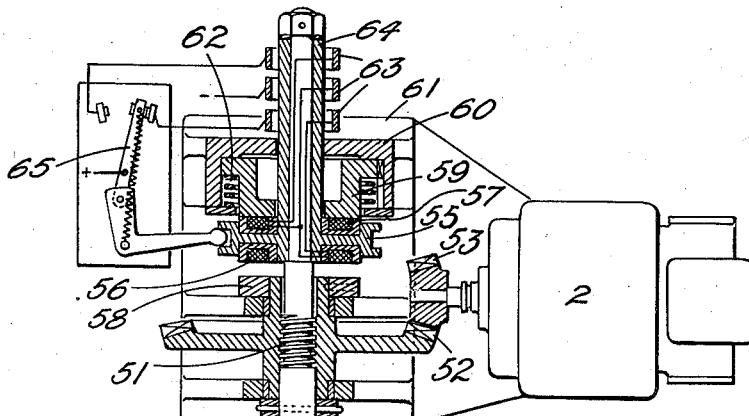
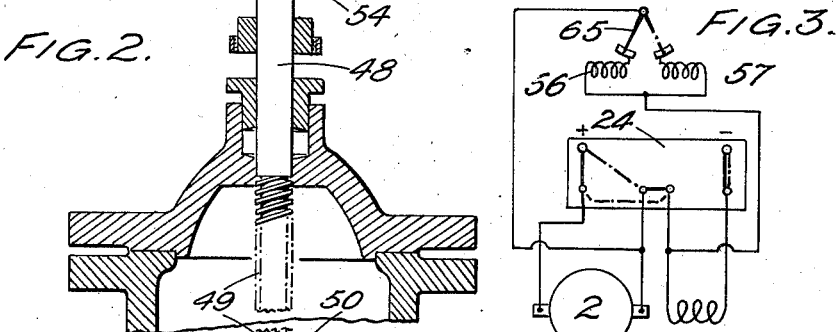
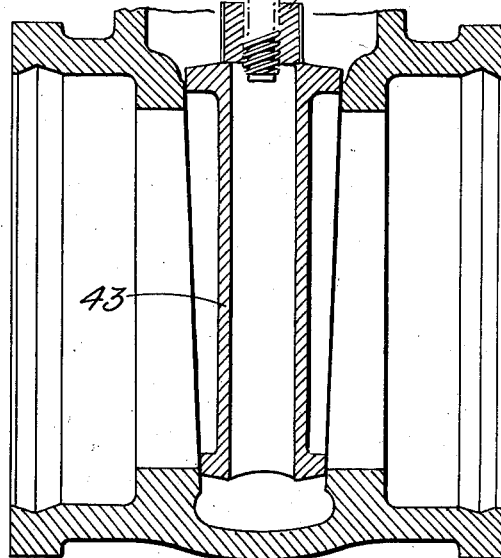
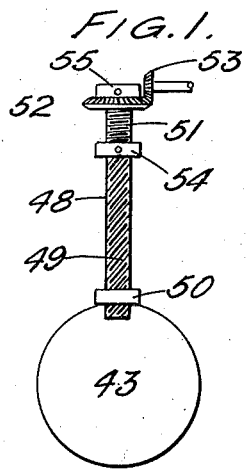
Inventor.
Joseph F. Tucker.
By Sommers & Young
Attys.

Patented Sept. 7, 1937

2,092,563

UNITED STATES PATENT OFFICE 2,092,563

SCREW MECHANISM

Joseph Francis Tucker, Little Thrift, Petts Wood, England, assignor to J. Stone & Company, Limited, Deptford, England, a company of Great Britain Original application February 12, 1936, Serial No. 63,669. Divided and this application February 10, 1937, Serial No. 125,168. In Great Britain February 14, 1935

7 Claims. (Cl. 74—424.8)

This invention concerns improvements relating to apparatus for the operation of ships' bulkhead or anti-piracy doors, water-tight or fireproof doors for other purposes, sluice gates or valves, shutters, and the like apparatus wherein a high initial resistance may have to be overcome before the door, valve or the like can be opened.

For example in the case of certain types of valves, a high initial resistance has generally to be overcome in withdrawing the valve from a seating of wedge-formation upon opening, particularly if the natural wedging effect from the previous closure is accentuated by the presence of dirt or by distortion of the seating. Once the valve is started from the wedge-formation, however, the resistance to be overcome is much smaller.

According to the invention, mechanism for the operation of a bulkhead-door, valve or the like apparatus of the kind indicated above comprises parts with slower and faster screw-threads arranged so that, in the opening operation, initial resistance is overcome through the intermediary of the slower thread and normal resistance through that of the faster thread, and means adapted for acting upon one of the said parts to ensure automatically that the slower thread is screwed down first in the operation of closing the said door, valve or the like. For ensuring that the slow thread is screwed down first, provision may be made of automatically controlled electromagnetic clutch means adapted for initially holding a part provided with the quick thread against rotation and, if required, for subsequently clutching the said part to a driving member for rotation therewith.

As will be understood, such mechanism not only provides the required higher mechanical advantage, but also avoids the danger of the door, valve or the like being jammed down excessively tightly at closure. The use of such mechanism in conjunction with electrical driving means is particularly advantageous, since it permits of the employment of a convenient switching arrangement for the electromagnetic clutch means as well as the use of a motor of economical size, a factor which is of especial importance in the case of the electrical drive.

One embodiment of the invention by way of example will now be described with reference to the accompanying drawing, in which:—

Fig. 1 is an explanatory diagram illustrating screw and nut mechanism,

Fig. 2 is a vertical section showing an electrically operated valve embodying the invention and Fig. 3 is a circuit diagram.

As illustrated in Fig. 1, the screw and nut mechanism comprises a spindle 48 engaging by a quick thread 49 in a nut 50 fixed to, say, a valve-member 43 and by a slow thread 51 in a driving nut member 52 restrained from axial movement, e. g. a bevel-wheel to which the drive is transmitted from a bevel-wheel 53. The length of the slow thread 51 need be sufficient only for the movement necessary to overcome initial resistance and this length is bounded by stop collars 54, 55 fast on the spindle. The length of the quick thread is sufficient to complete the opening movement of the valve.

Upon commencing to rotate the driving nut member 52 with the valve 43 closed, as in Figure 1, the spindle 48 is initially raised bodily with the valve, but without rotating, by the action between the slow thread 51 and the driving nut member 52. This movement, which is effected with the high-mechanical advantage of the slow thread, is arrested when the lower stop 54 abuts on the driving nut member 52. The spindle is thenceforward constrained to rotate with the driving member and the valve is raised rapidly with the lower mechanical advantage of the fast thread 49 by the action between the latter and the nut 50.

Thus a large lifting force is applied for a small initial amount of travel of the valve and a smaller force suited to the normal resistance and required speed of opening of the valve, is applied for the rest of its travel.

Upon rotating the driving member in the reverse direction, in order to close the valve, it is important that the slow thread 51 should be screwed down first, since otherwise it would come into action when the valve reached its wedge-seating and, by reason of the high mechanical advantage, might so jam the valve in the seating as to render subsequent opening difficult. To ensure this order of action of the threads, provision is made of automatic electro-magnetic brake mechanism whereby the spindle 48 is initially held against rotation and, if desired, may subsequently be clutched to the driving member 52 to rotate therewith. As will be understood, the action of such brake mechanism is not required in the valve-opening operation.

As illustrated in Fig. 2, the brake mechanism comprises a dished plate 55 of magnetic material which takes the place of the upper stop and has exciting windings 56, 57 in its faces. This plate 55 is fast on the spindle 48 between coacting plates 58, 59 of magnetic material of which the lower 58 is keyed to the driving member 52 and the upper 59 is restrained against rotation in a bracket 60 on the framing 61. The plate 59 is permitted a degree of axial movement downwardly against the resistance of a spring 62. The windings 56, 57 are excited over slip-rings 63 carried on a tubular upward extension 64 of the clutch-plate 55. A quick-throw switch 65, arranged to be tripped mechanically from the clutch-plate, is provided for changing over the excitation from one set of windings 56, 57 to the other. Automatic switch means is provided for preparing the excitation circuit for these windings only when the valve is being closed. For example, where the valve is driven from an electric motor 2, the starting contactor switch-gear 24 Fig. 3, may be modified or arranged to ensure this condition. Fig. 3 shows one possible arrangement for a series wound motor 2. Thick full lines indicate the connections made for the opening movement, and chain lines for the closing movement. The starting switch-gear may be controlled by limit-switches and/or manual switches in known manner.

The operation of closing the valve takes place as follows:—

The driving motor 2 is switched on and the excitation circuit is completed through the electromagnet 57 which acts upon the non-rotatable upper plate 59. The clutch plate 55 and the spindle 48 are thus held against rotation. The slow thread 51 therefore works down in the nut of the gear-wheel 52 and the spindle descends without rotation, carrying with it the clutch-plate and the plate 59. When the clutch-plate has thereby been brought almost into contact with the lower co-acting plate 58, the switch 65 is tripped to transfer the excitation to the electromagnet 56 acting upon the said lower plate. The upper plate 59 is returned upwardly by the spring 62, whilst the gear-wheel 52 becomes clutched to the spindle through the lower plate. The valve 43 is then closed rapidly with the low mechanical advantage of the quick thread 49 working in the nut 50. The switch 65 is reset automatically in the next valve-opening movement, but has no effect as the switch and electromagnets are short-circuited at the contactor switch-gear. In Fig. 2, it will be seen that the valve 43 has been initially lifted from its wedge-shaped seating by the rising of the spindle 48 due to the action of the slow thread 51, and that such rising has brought the clutch plate 55 against the upper plate 59 thereby resetting the switch 65 ready for the next valve opening operation. The switch 65 may have a fine adjustment to determine its tripping point. Particularly if the fast thread 49 does not form an irreversible connection, an electro-magnetically controlled spring-loaded brake may be provided for holding the valve in the open position. The electro-magnetic brake control may also be performed by the contactor switch-gear 24.

The mechanism described can also be applied to the similar case of bulkhead doors, especially such as are operated by electric motors. Particularly in the latter case, use may be made with advantage of controlling switch-gear of the kind described in the specification of my co-pending patent application Serial No. 63,669, filed February 12, 1936, of which this case is a division.

Whilst transmission mechanism in accordance with this invention has proved especially useful with electrical power, its use is of advantage irrespective of what source of power is employed, e. g. whether manual, hydraulic or pneumatic. It is unnecessary, in the case of power operation, to provide an uneconomically large motor in order to permit the initial resistance or load to be overcome. The motor need be large enough to overcome the normal resistance or load only.

I claim:—

1. Means for driving apparatus of the kind set forth, wherein a high resistance may have to be overcome at the initial part of the opening of the apparatus, comprising a driving motor, screw and nut mechanism operatively connecting the motor and apparatus, said mechanism having parts with slower and faster screw-threads, the slower screw thread being operative during the initial part of the opening operation, so that initial resistance is overcome through the intermediary of the slower thread and normal resistance through that of the faster thread, and brake means for acting upon one of the said parts to ensure automatically that the slower thread is screwed down first in the operation of closing the said apparatus.

2. Means for driving apparatus of the kind set forth, wherein a high initial resistance may have to be overcome at the initial part of the opening of the apparatus, comprising a driving motor, screw and nut mechanism operatively connecting the motor and apparatus and having parts provided with slower and faster screw-threads, the slower screw thread being operative during the initial part of the opening operation, so that initial resistance is overcome through the intermediary of the slower thread and normal resistance through that of the faster thread, and an automatic clutch-device having means for initially holding the part provided with the faster thread against rotation, and means for operatively connecting the said part to the motor to be driven thereby.

3. Means for driving apparatus of the kind set forth, comprising a driving motor, screwed spindle and nut mechanism having parts with faster and slower screw-threads and operatively connecting the said motor to the apparatus, and an automatic electromagnetic clutch-device comprising a clutch-plate fast on the spindle, a coacting plate located on one side of the first-named plate and operatively connected to the motor, a coacting plate located on the other side of the first-named plate, and means for restraining the last-named plate from rotation.

4. Driving means according to claim 3, wherein the means for restraining the last-named plate has a lost motion for permitting a restricted axial movement of the latter towards the first-named plate, and spring means is provided for resisting such movement.

5. Means for driving apparatus of the kind set forth, comprising a driving motor, screwed spindle and nut mechanism having parts with faster and slower screw threads and operatively connecting the said motor to the apparatus, and an automatic electromagnetic clutch-device comprising a clutch-plate fast on the spindle, a coacting plate located on one side of the first-named plate and operatively connected to the motor, a coacting plate located on the other side of the first-named plate, means for restraining the last-named plate from rotation, switch means controlling the excitation of the electromagnetic clutch-device, and switch-actuating means operatively connecting the first-named clutch plate with the switch-means.

6. Driving means according to claim 5, and comprising also, in combination with the exciting circuit of the electromagnetic clutch-device, automatic switch-means for preparing the said circuit only when the apparatus is to be driven in one direction.

7. Means for driving apparatus of the kind set forth, comprising an electric motor, starting switch-gear for the said motor, screwed spindle and nut mechanism having parts with faster and slower screw-threads and operatively connecting the said motor to the apparatus, and an automatic electromagnetic brake mechanism comprising a clutch-plate fast on the spindle, a coacting plate located on one side of the first-named plate and operatively connected to the motor, a second coacting plate located on the other side of the clutch plate, means for restraining said second coacting plate from rotation, an excitation circuit for the brake mechanism, and means incorporated in the starting switch-gear for closing the said circuit.

JOSEPH FRANCIS TUCKER.